J. G. FUNK.
AIR SPRING.
APPLICATION FILED DEC. 13, 1912.
1,140,344.
Patented May 18, 1915.
2 SHEETS—SHEET 1.
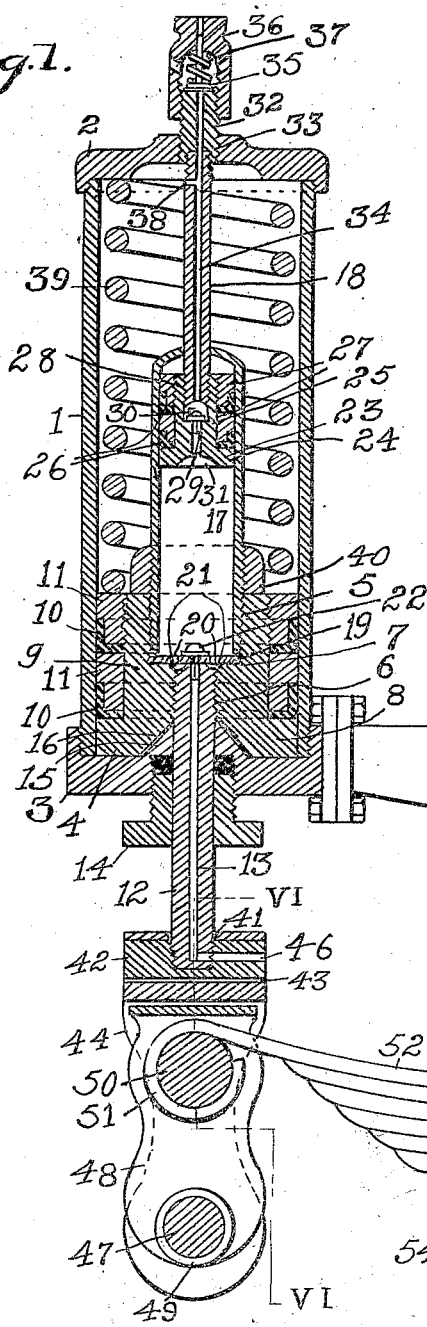
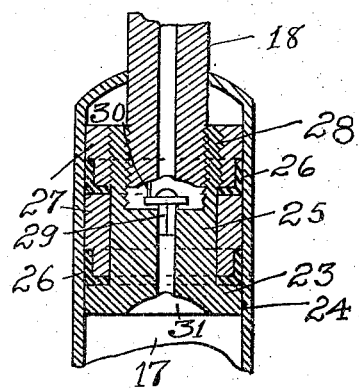
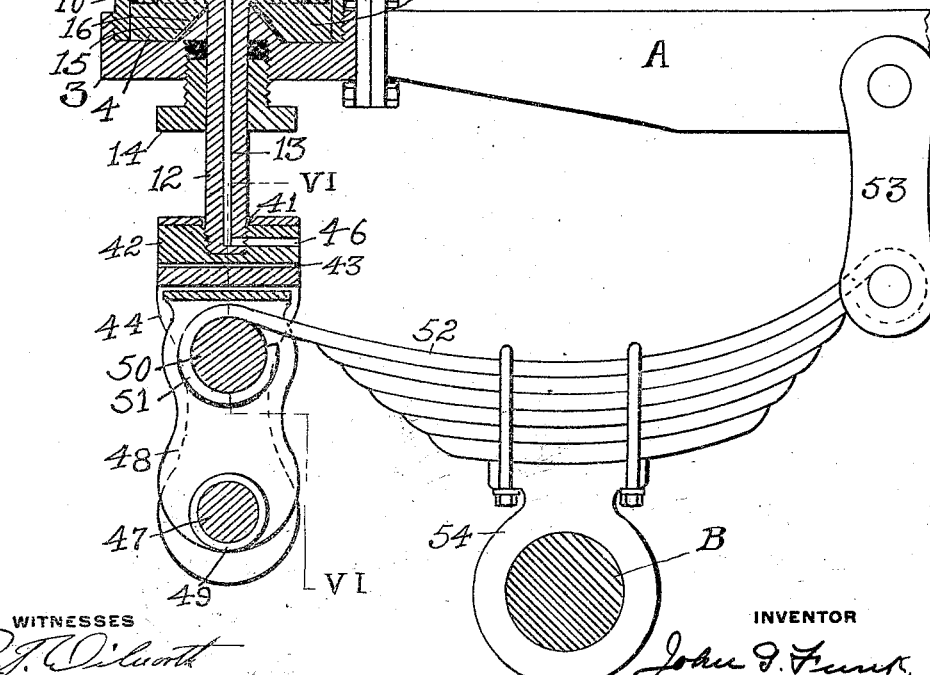
WITNESSES
INVENTOR
John G. Funk,
by Edward A. Lawrence
his attorney

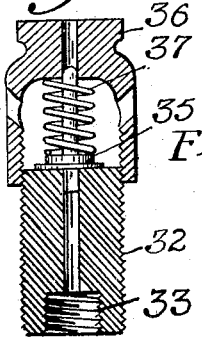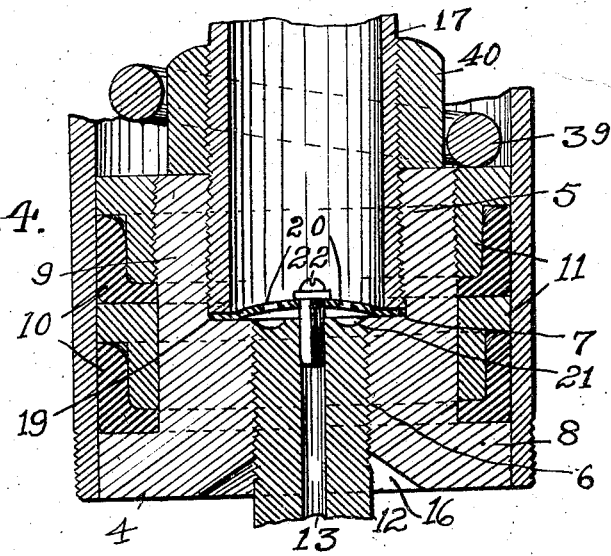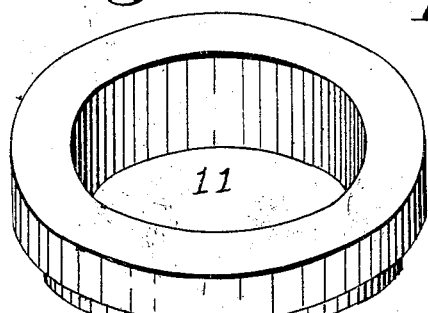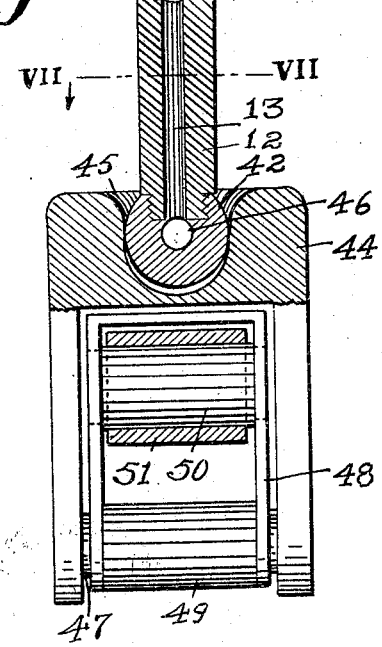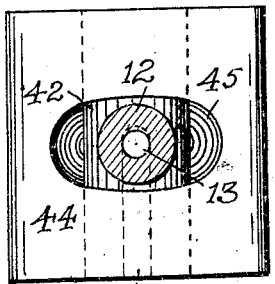

UNITED STATES PATENT OFFICE.

JOHN G. FUNK, OF SWISSVALE BOROUGH, PENNSYLVANIA.

AIR-SPRING.

1,140,344.      Specification of Letters Patent.      Patented May 18, 1915.

Application filed December 13, 1912. Serial No. 736,462.

*To all whom it may concern:*

Be it known that I, JOHN G. FUNK, a citizen of the United States, and residing in the borough of Swissvale, in the county of Allegheny and State of Pennsylvania, have invented or discovered new and useful Improvements in Air-Springs, of which the following is a specification.

My invention consists of a new and improved air-spring or cushion device intended for use either as a substitute for or in combination with the usual resilient metallic springs of a vehicle such as an automobile; four of my air-springs being usually provided for each vehicle, two for each axle.

Generally speaking, my invention consists of a cylinder, connected to one element of the vehicle, such as the frame, and a piston working in said cylinder and connected to another element of the vehicle, such as the axle. Means are provided for automatically establishing and maintaining an air-pressure in said cylinder in front of said piston sufficient to cushion or balance the load imposed upon said spring, the imposing of an increased load upon said air-spring automatically resulting in pumping up the air pressure in the cylinder to balance the same. Any reduction of pressure which may result from leakage or other causes is automatically compensated for by a temporary resumption of the pumping process. An automatic relief valve may be provided for the cylinder whereby a limit of cylinder pressure may be determined and any rise above said limit automatically relieved. A relatively heavy coiled spring is preferably placed in said cylinder between the inner end of the same and the piston to provide initial reciprocation of the piston for the initial pumping of air into the cylinder. New and improved means are provided for mounting the piston on the vehicle, and other novel features of construction and arrangement of parts will appear from the following description.

In the accompanying drawings, Figure 1 is a vertical section of my air-spring interposed between the frame and the axle of a vehicle: Fig. 2 is an enlarged detail in section of the pump plunger head with its valve open; Fig. 3 is an enlarged detail in section of the relief valve; Fig. 4 is an enlarged detail in section of the piston, showing its valve open; Fig. 5 is a perspective of one of the followers for the leather packing cups of the piston; Fig. 6 is an enlarged detail, partially in section along the line VI—VI in Fig. 1, showing the method of connecting the outer end of the piston rod to the vehicle, and Fig. 7 is a plan view, partially in section along the line VII—VII in Fig. 6, showing said connection.

The following is a detailed description of the drawings.

A represents a portion of a vehicle frame and B represents one of the axles of the vehicle.

1 is a cylinder closed at its inner or upper end by a cap 2 and closed at its lower or outer end by a head 3 by means of which said cylinder may be bolted or otherwise secured to the frame A.

4 is a piston working in said cylinder. Said piston is hollow, having an inner or upper bore 5 of greater diameter than its outer or lower bore 6. Both of said bores are threaded. The shoulder formed by the ends of the adjacent bores is marked 7.

The lower or outer external diameter 8 of said piston maintains a sliding fit with the cylinder 1, while the upper or inner external diameter of said piston is reduced to form a seat 9 for the leather packing rings or cups 10 and their metal follower rings 11, the upper ring 11 being threaded on the portion 9 of the piston to clamp the leather cups and their followers snugly into place.

12 is the piston rod having a cylindrical longitudinal bore 13 and extending through a stuffing box 14 in the head 3 of the cylinder. The inner end of piston rod 12 is screwed into the reduced bore 6 of the piston 4.

15 is a concentric conical projection on the inner face of head 3 which is adapted to seat in the corresponding recess 16 in the face of piston 4 to properly center the latter.

17 is a pump barrel having one end open and screwed into the bore 5 of piston 4 while the upper end of said barrel is contracted to guide the plunger rod 18.

19 is a flexible leather diaphragm or disk having its edge clamped against shoulder 7 by the lower end of tube 17, and provided with perforations 20 which register with the annular concentric groove 21 in the upper end of piston rod 12.

22 is a puppet valve whose head rests upon the inner face of disk 19 and whose stem, preferably squared, extends through said disk and seats in the cylindrical bore 13 of piston rod 12.

23 is a plunger head working in barrel 17 and having its lower exterior diameter, 24, in sliding fit with the barrel 17 and its upper exterior diameter reduced to form a seat 25 for the leather packing cups 26 and their metal follower rings 27, the upper follower being threaded onto the wall of seat 25 to hold said cups snugly in place.

The upper bore 28 of head 23 is enlarged and threaded to receive the threaded end of plunger rod 18 while the lower bore of said head is reduced to accommodate the squared stem of the valve 29 whose head works in the bore 28. The upward movement of the puppet valve 29 may be limited by any convenient means, such as a stop pin 30. The lower end of head 23 is preferably countersunk as at 31 to provide clearance for the valve mechanism in piston 4 should said head 23 strike said piston.

32 is a nipple screwed into a threaded concentric hole in cap 2 and whose lower bore 33 is enlarged and threaded to receive the upper end of plunger rod 18 whose bore 34 registers with the bore of said nipple 32. It is evident that the extension of rod 18 in the cylinder 1 may be adjusted by said nipple.

It is evident that the barrel 17 is mounted on and reciprocates with piston 4 and the plunger head 23 is mounted and reciprocates with cylinder 1.

The upper end of the bore of nipple 32 is normally closed by means of an outwardly opening valve 35 whose stem is guided by a cage 36 screwed on nipple 32, a coiled spring 37 embracing said stem and bearing at its ends against the valve 35 and the cage 36 to hold said valve resiliently in its seat. By screwing up or unscrewing the cage 36, said valve is adjusted to open outwardly at any desired internal pressure in the cylinder 1.

38 is a lateral port in the wall of plunger rod 18 connecting the bore 34 of said rod with the interior of the cylinder 1.

39 is a relatively strong coiled spring in the cylinder 1 whose ends are adapted to contact respectively with the piston 4 and the cap 2 of cylinder 1. A collar 40 is screwed on the base of barrel 17 to serve as a guide for spring 39 to keep it in proper place.

The internal operation of my air-spring is as follows. Assuming initial atmospheric pressure in the cylinder 1, the relief valve 35 is adjusted to relieve at the proper cylinder pressure. Thus a heavily loaded vehicle will require a greater cylinder pressure to balance or cushion the load than a lightly loaded vehicle, so that the relief valve should be set to operate automatically whenever the internal pressure of the air-spring rises above that dictated by the load upon the spring. The vehicle is now put into motion and the spring 39 contacting with the cap 2 and the piston 4 causes the piston to reciprocate in the cylinder, thus causing a like relative movement between the barrel 17 and the plunger head 23. The descent of head 23 in barrel 17 closes the valve 22 in the piston and prevents the escape of air through the piston rod 12, and opens the valve 29 in the plunger head, permitting the air compressed under the head 23 to pass up through said head into the bore of plunger rod 18 and out through the port 38 into the interior of the cylinder 1. The rise of head 23 in barrel 17 will close the valve 29 in said head and suck up the leather disk 19 and open the valve 22 to admit air into barrel 17. It is evident that the reciprocation of the head 23 and the barrel 17 will gradually establish and maintain an air-pressure in said cylinder 1 which will be sufficient to balance the load on the air-spring. When the pressure in cylinder 1 is sufficient to properly balance the load on the air-spring, the pressure above the valve 29 will prevent the said valve from opening to admit more air, since the effect of the load tending to open said valve is balanced by the pressure above said valve. Such balancing pressure, once established will be automatically maintained without further admission of air. In case of leakage, as between the piston and the cylinder, the internal pressure of the cylinder will no longer be able to prevent the valve 29 opening and therefore a fresh supply of air will be pumped into the cylinder to compensate for such leakage or other loss. In case the load upon the air-spring is increased, the pumping of air into said spring will be resumed until once more the air-pressure in the cylinder balances the load upon the air-spring, whereupon the introduction of air will cease and the balance be maintained. In case of a sudden jolt or abnormal reciprocation of the air-spring unduly raising the internal pressure of the cylinder, the relief valve 35 will open and automatically relieve the excess pressure and close immediately without further loss of pressure. If desired, the relief valve may be omitted and the excess pressure be permitted to dissipate through leakage as before referred to.

Any convenient means may be employed for mounting the cylinder and piston on the vehicle. I have shown a simple, yet flexible and efficient connection for the piston rod, wherein the lower end of said rod is screwed into a radial port 41 in the short shaft 42 which is seated in and rocks in the bore 43 in the head of a clevis 44. A transverse slot 45 in said head intersects the bore 43 to accommodate the piston rod 12, permitting the same to be screwed into the port 41 and also permitting the shaft 42 to rock. It is evident that the shaft 42 cannot be unseated from the clevis without first unscrewing the piston rod 12.

The rock shaft 42 is provided with an axial bore or passage 46 which connects the bore 13 of piston 12 to atmosphere.

The lower ends of clevis 44 are provided with a cross-pin 47 upon which are pivoted the lower ends of a second clevis 48 nesting in clevis 44.

49 is a spacer ring on pin 47 between the legs of clevis 48.

50 in the cross-pin in the upper portion of clevis 48 which passes through the eye 51 on one end of a leaf-spring 52 whose other end is secured to the frame A by any convenient means, as by bridle 53. The leaf-spring 52 is secured to axle B intermediate of its ends as by collar 54.

It is evident from the foregoing that my air-cushion is automatic in its action, pumping itself up to balance any load that may be imposed upon it, maintaining said balance, compensating for leakage of air-pressure, and relieving excess pressure automatically. By adjusting the relief valve, the air-spring may be adapted to properly support and cushion any given load. The method of mounting shown removes all danger of injury to or loss of effectiveness of the air-spring, and is both inexpensive and substantial.

It is evident that I may omit the spring 39 and initially pump the cylinder up to the proper pressure by means of a suitable pump before starting the vehicle to travel but I prefer the automatic pumping action described.

Although for the sake of clearness I have minutely described the embodiment of my invention shown in the drawings, I do not wish to limit myself thereby but claim broadly—

1. In an air-spring, a cylinder, a piston reciprocable therein, an air-pumping chamber mounted on said piston and having a valved inlet-port communicating with the atmosphere, a pumping-piston working in said air-pumping chamber and mechanically connected with and moving with said cylinder and provided with a valved outlet-port, constituting the outlet from said chamber.

2. In an air-spring, a cylinder, a piston reciprocable therein, an air-pumping chamber mounted on said piston and having a valved inlet-port communicating with the atmosphere, a pumping-piston working in said air-pumping chamber and mechanically connected with and moving with said cylinder and provided with a valved outlet-port, constituting the outlet from said chamber, and an automatic pressure-relief valve for said cylinder.

3. In an air-spring, a cylinder, a piston reciprocable therein, an air-pumping chamber mounted on said piston and having a valved inlet-port communicating with the atmosphere, a pumping-piston working in said air-pumping chamber and mechanically connected with and moving with said cylinder and provided with a valved outlet-port, constituting the outlet from said chamber, and a coiled spring interposed between said cylinder-piston and the end of said cylinder.

4. In an air-spring, a cylinder, a piston reciprocable therein, an air-pumping chamber mounted on said piston and having a valved inlet-port communicating with the atmosphere, a pumping-piston working in said air-pumping chamber and mechanically connected with and moving with said cylinder and provided with a valved outlet-port, constituting the outlet from said chamber, an automatic pressure-relief valve for said cylinder, and a coiled spring interposed between said cylinder-piston and the end of said cylinder.

5. In combination with the cylinder, piston and piston rod of an air-spring, a mounting for said piston rod consisting of a block having a longitudinal bore and a transverse slot intersecting said bore, and a rock-shaft seated in said bore and having a radial port, the end of said piston rod extending through said slot and being secured in said port.

6. In combination with the cylinder, piston and piston rod of an air-spring, said piston rod being hollow for the introduction of air into said air-spring, a mounting for said piston rod consisting of an element having a longitudinal bore and a transverse slot intersecting said bore, and a rock-shaft seated in said bore and having a longitudinal passage and a radial port, the end of said piston extending through said slot and being secured in said port and the interior of said hollow piston rod communicating with the longitudinal passage in said rock shaft for the admission of air into said piston rod.

7. In an air-spring, a cylinder, a piston reciprocable therein, an air-pumping chamber carried by said piston and having a valved inlet-port communicating with the atmosphere, the upper or inner end of said pumping chamber being open to the admission of fluid from the interior of said chamber, and a pumping-piston working in said air-chamber and carried by said cylinder and provided with a valved outlet port, constituting the outlet for said chamber.

8. In an air-spring, a cylinder, a piston reciprocable therein, an air-pumping chamber carried by said piston and having a valved inlet-port communicating with the atmosphere, the upper or inner end of said pumping chamber being open to the admission of fluid from the interior of said chamber, a pumping-piston working in said air-chamber and carried by said cylinder and provided with a valved outlet port, constituting the outlet for said chamber, and an automatic pressure-relief valve for said cylinder.

9. In an air spring, a cylinder; a piston reciprocable therein; an air pumping chamber mounted on said piston within said cylinder and having an inwardly opening air valve connecting said chamber to atmosphere; a pumping piston mechanically connected with and moving with said cylinder working in said chamber, and an inwardly opening valve in said pumping piston connecting said chamber with the interior of said cylinder whereby when the pressure in said cylinder is sufficient to sustain the load imposed upon said air spring said last mentioned valve is closed.

10. In an air spring, a cylinder; a piston reciprocable therein; an air pumping chamber mounted on said piston within said cylinder and having an inwardly opening air valve connecting said chamber to atmosphere; a pumping piston mechanically connected with and moving with said cylinder working in said chamber; an inwardly opening valve in said pumping piston connecting said chamber with the interior of said cylinder whereby when the pressure in said cylinder is sufficient to sustain the load imposed upon said air spring said last mentioned valve is closed, and a relief valve for the escape of excess pressure from said cylinder.

Signed at Pittsburgh, Penna., this 11th day of December, 1912.

JOHN G. FUNK

Witnesses:
E. A. LAWRENCE,
W. S. WALSH.